United States Patent
Chiba et al.

(10) Patent No.: US 11,553,786 B2
(45) Date of Patent: Jan. 17, 2023

(54) TOOTHBRUSH HAVING DENTAL FLOSS

(71) Applicants: Makiko Chiba, Tokyo (JP); Miho Baba, Kanagawa Pref. (JP); Yuki Giga, Tokyo (JP); Kako Kondo, Tokyo (JP)

(72) Inventors: Makiko Chiba, Tokyo (JP); Miho Baba, Kanagawa Pref. (JP); Yuki Giga, Tokyo (JP); Kako Kondo, Tokyo (JP)

(*) Notice: Subject to any disclaimer, the term of this patent is extended or adjusted under 35 U.S.C. 154(b) by 358 days.

(21) Appl. No.: 16/831,860

(22) Filed: Mar. 27, 2020

(65) Prior Publication Data
US 2020/0221861 A1    Jul. 16, 2020

(51) Int. Cl.
*A46B 15/00* (2006.01)

(52) U.S. Cl.
CPC ...... *A46B 15/0071* (2013.01); *A46B 15/0073* (2013.01); *A46B 2200/1066* (2013.01)

(58) Field of Classification Search
CPC ............ A46B 15/0069; A46B 15/0071; A46B 15/0073; A46B 2200/1066
USPC ........................................................ 132/309
See application file for complete search history.

(56) References Cited

U.S. PATENT DOCUMENTS

| | | | | |
|---|---|---|---|---|
| 4,004,597 A | * | 1/1977 | Kupperman | A61C 15/046 132/309 |
| 5,269,331 A | * | 12/1993 | Tanriverdi | A61C 15/046 132/325 |
| D778,060 S | * | 2/2017 | Finkel | D4/108 |
| 2004/0040571 A1 | * | 3/2004 | Williams, Sr. | A46B 15/0071 132/309 |
| 2010/0186182 A1 | * | 7/2010 | Avila | A46B 15/0081 132/309 |
| 2015/0027488 A1 | * | 1/2015 | Charles Ray | A46B 15/0071 132/309 |
| 2016/0192770 A1 | * | 7/2016 | Trent | A46B 17/04 132/309 |

* cited by examiner

*Primary Examiner* — William V Gilbert

(57) ABSTRACT

A toothbrush having Dental floss includes a main body having a cartridge housing portion formed in an upper portion at one end and a brush portion formed in a lower portion thereof and a floss cartridge, which includes a bridge for cleaning as area between teeth, having a first gear, a second gear and a floss, wherein the floss cartridge is attachable and detachable to and from the cartridge housing portion, wherein a new floss stored in the floss cartridge is fed by the first gear in the floss cartridge, and the used floss is wound by the second gear.

12 Claims, 5 Drawing Sheets

TOOTHBRUSH HAVING DENTAL FLOSS

BACKGROUND OF THE INVENTION

1. Field of the Invention

This invention has been made by the members of MIMURA Seminar, Graduate School of Law, Nihon Univ. as a team. The invention related to a toothbrush, and more particularly to a toothbrush having dental floss.

2. Description of the Related Art

In the related art, a toothbrush has only a function of brushing teeth, but not a function of removing tartar between teeth. In the case of traveling, a toothbrush should be brought together with a box having dental floss, so that they have to be put in the bag as an extra staff. Since the life of the toothbrush and the life of the floss were not the same, it was very troublesome to purchase one of them separately. In the case that an individual floss is used instead of the box having the floss, a floss frame, which is generally made of plastic, is required for the individual floss, and it is very bad for the environment to dispose it after use.

When using the floss in the box, it is very troublesome to pull out the floss by hand from the box while the use of the box having the floss would be nature friendly then the individual floss being used.

SUMMARY OF THE INVENTION

The objective of the present invention is to resolve above described problem, and to provide toothbrush embodied a function of removing the tartar in addition to a function of brushing a tooth by integrating the toothbrush and the floss.

BRIEF DESCRIPTION OF THE DRAWINGS

The invention will be more particularly described with reference to the accompanying drawings, in which.

DETAILED DESCRIPTION OF THE PREFERRED EMBODIMENTS

First Preferred Embodiment

Figure 1:
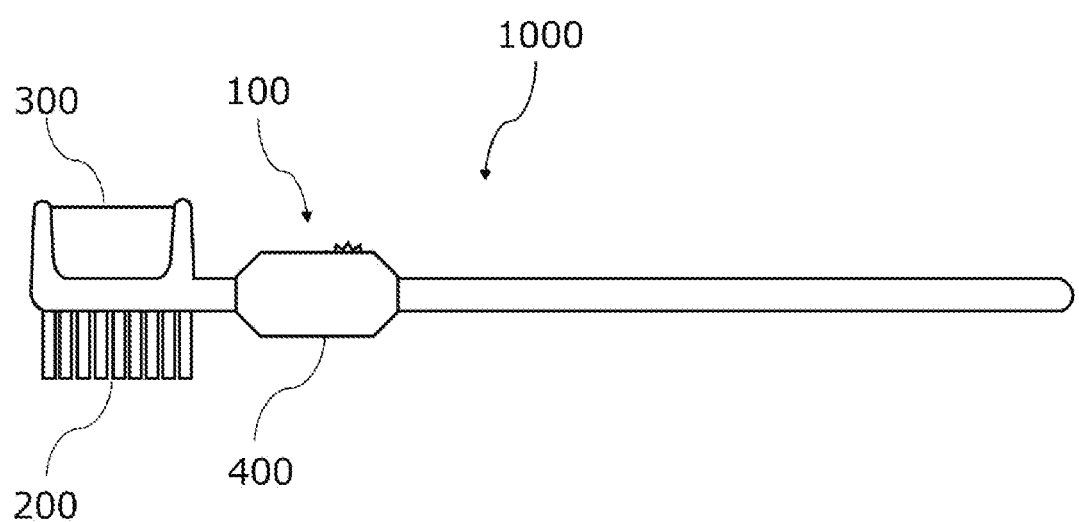
FIG. 1 shows a side view of a toothbrush, according to a first embodiment of the present invention.

A preferred embodiment of the present invention for a dental flossed toothbrush (hereinafter referred to as toothbrush) is described with reference to the drawings as follows. In each drawing, the same reference numerals refer to the same or similar parts throughout all embodiments.

Figure 1A:
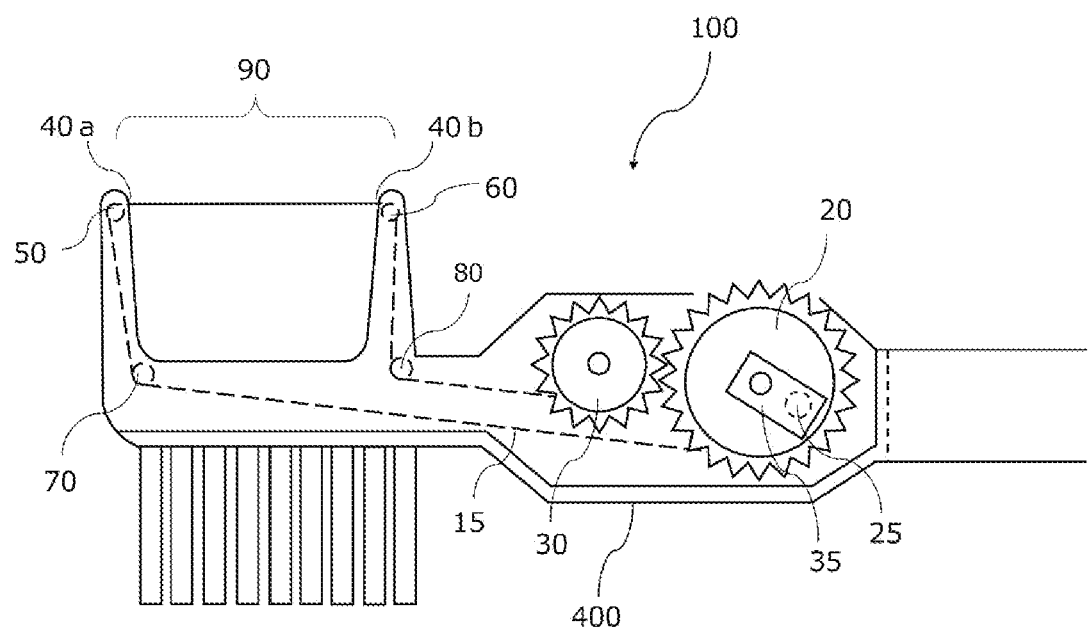
FIG. 1A shows a cross-sectional view indicating a mechanism inside a toothbrush cartridge, according to a first embodiment of the present invention.

FIG. 1 is a side view of a toothbrush according to a first embodiment of the present invention. FIG. 1A shows a cross-sectional view of an internal mechanism of a toothbrush cartridge according to a first embodiment of the present invention.

As shown in FIG. 1, the toothbrush 1000 of the first embodiment includes a brush portion 200, a floss portion 300 formed on the back surface of the brush portion 200, and a cartridge 100 detachably coupled within a cartridge housing portion 400 for providing floss 15 to the floss portion.

As shown in FIG. 1A, the cartridge 100 includes a first gear 20 on which an unused floss 15 is wound, a second gear 30 coupled with a first gear 20 on which the used floss 15 is wound, a bridge 90 for fixing the floss, and a first through a fourth hooks.

The first gear 20 has a through-hole 25 for engaging with a stopper to be described later. A first hole 40a for discharging the floss and a second hole 40b for storing the floss 15 are formed at the tip of the bridge 90. The first hook 50 is formed in the vicinity of the first hole 40a. The second hook 60 is formed in the vicinity of the second hole 40b. The third hook 70 and the fourth hook 80 are formed at the root of the bridge. The floss 15 70 housed in the first gear 20 is wound around the second gear 30 through the inside of the third hook 80, the first hook 50 and the second hook 60 in this order. The floss 15 maintains the tension of the floss 15 between the bridges 90 by a mechanism (not shown). A part of the first gear 20 is exposed outside the cartridge 100.

The toothbrush 1000 with dental floss thus formed is used as follows. After the tooth is washed by using the brush part 200, the interdental space is further washed by using the floss 15.

After cleaning, when the user starts the rotating operation with the first gear 20 in front, the stopper formed in the braking device 35 engaged with the through-hole 25 comes off. At this time, the first gear 20 is controlled by a braking device 35 having a stopper inside. When the first gear 20 turns around, the stopper is engaged with the through-hole 25 to stop the movement of the first gear 20. Since the length of the bridge 90 is normally set to about 15 mm, the diameter of the first gear 20 is set to $15/\pi$ mm. Thus, a new floss 15 is set by going around the first gear 20. The second gear 30 is engaged with the first gear 20, and the second gear 30 is also interlocked and rotated by rotating the first gear 20, and the used floss 15 is stored in the second gear 30. At this time, the second gear 30 is made smaller than the first gear 20. This prevents the floss 15 from coming into contact with the cartridge 100.

After the floss 15 is used up, the cartridge 100 is removed from the cartridge storage part 400 and a new cartridge 100 is attached.

Second Preferred Embodiment

Figure 2:
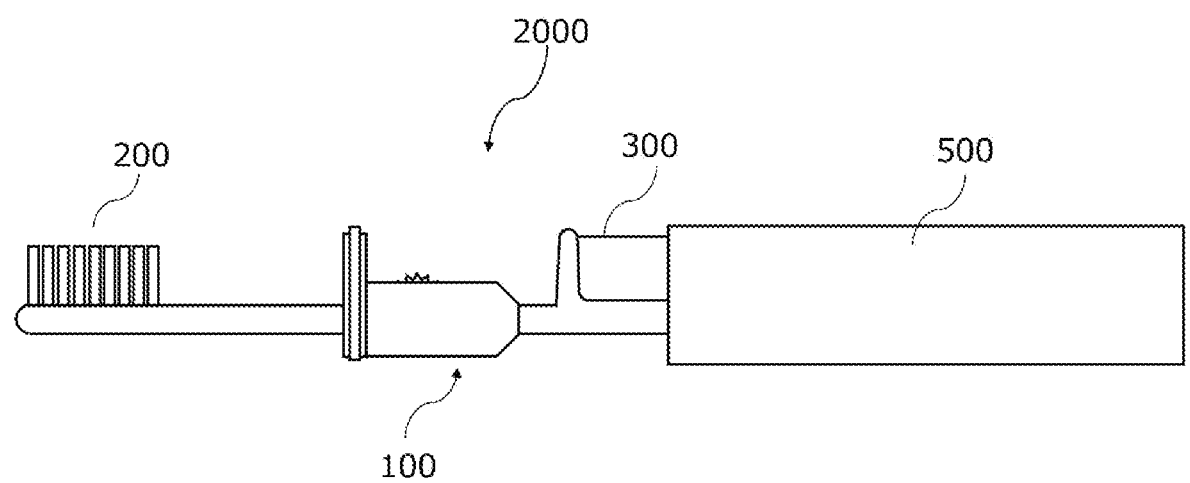
FIG. 2 shows a side view of a toothbrush, according to a second embodiment of the present invention.
Figure 2A:
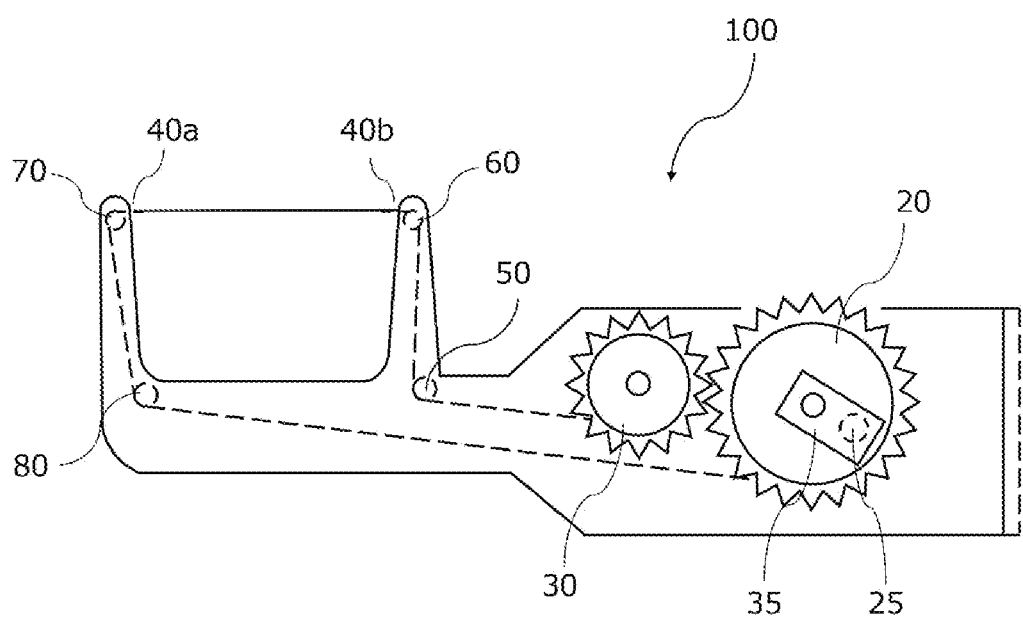
FIG. 2A shows a cross-sectional view indicating a mechanism inside a toothbrush cartridge, according to a second embodiment of the present invention.

FIG. 2 is a side view of a toothbrush according to a second embodiment of the present invention. FIG. 2A is a cross-sectional view showing a mechanism inside a toothbrush cartridge according to a second embodiment of the present invention.

As shown in FIG. 2, the toothbrush 2000 of the second embodiment includes a brush portion 200 formed at one end, a floss portion 300 formed at the other end, and a cartridge 200 detachably coupled in a cartridge storage portion 15 for providing floss 400 to the floss portion 100, and a cover portion 500 detachably attachable to the cartridge.

As shown in FIG. 2A, the cartridge 100 has the same structure as in FIG. 1A.

Third Preferred Embodiment

Figure 3:
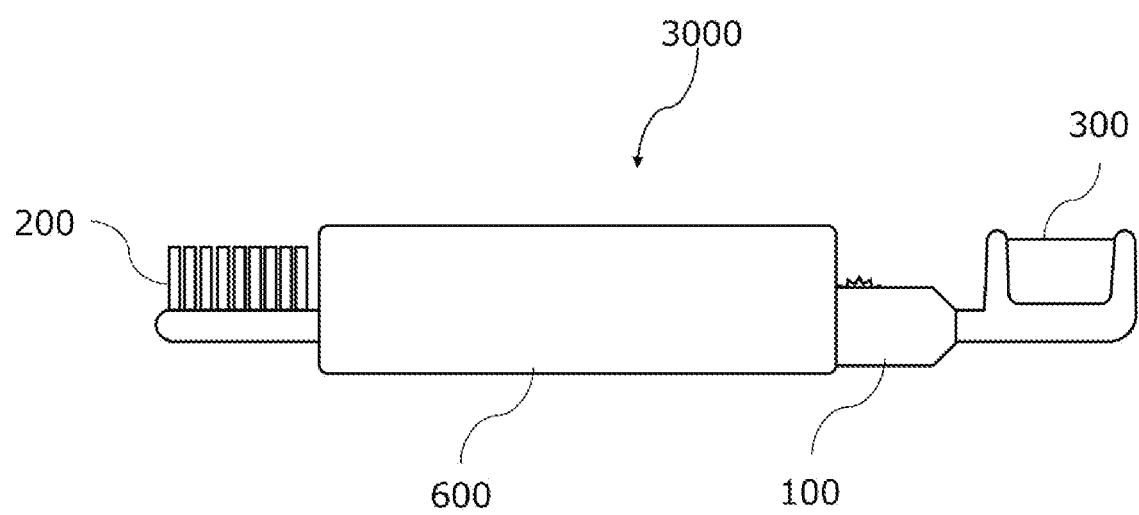
FIG. 3 shows a side view indicating an entire toothbrush, according to a third embodiment of the present invention.

FIG. 3 is a side view showing an entire toothbrush according to a third embodiment of the present invention.

As shown in FIG. 3, the toothbrush 3000 of the third embodiment includes a brush portion 200 formed at one end, a floss portion 300 formed at the other end, a cartridge 200 detachably coupled in a cartridge storage portion 15 for providing floss 400 to the floss portion 100, and a movable slide cover portion 600 for covering either the floss cartridge or the brush portion.

While the invention has been described with reference to illustrative embodiments, this description is not intended to be construed in a limiting sense. Thus, shapes, size and physical relationship of each component are roughly illustrated so the scope of the invention should not be construed to be limited to them. Further, to clarify the components of the invention, hatching is partially omitted in the cross-sectional views. Moreover, the numerical description in the embodiment described above is one of the preferred examples in the preferred embodiment so that the scope of the invention should not be construed to limit to them.

Various other modifications of the illustrated embodiment will be apparent to those skilled in the art on reference to this description. For example, the second gear is pulled to store the floss, in which case it is necessary to expose the second gear from the body. However, the smell of the used floss can be prevented from leaking by exposing the first gear on the delivery side. Therefore, the appended claims are intended to cover any such modifications or embodiments as fall within the true scope of the invention.

What is claimed is:

1. A toothbrush having a dental floss comprising:
    a main body having a cartridge housing portion formed in a first upper portion at one end, and a brush portion formed in a second lower portion thereof, wherein the first portion is located on an opposite side of the second portion of the main body; and
    a floss cartridge, which includes a bridge for cleaning at an area between teeth, having a first gear, a second gear and the floss, wherein a part of the floss is exposed, wherein a portion of the first gear is protruded from the floss cartridge, where the first gear and the second gear are engaged, wherein the first gear is circular, wherein the circumference of the first gear is substantially equal to the length of the bridge, wherein the first gear including a through-hole has a control device for controlling the movement of the first gear, wherein the control device includes a stopper, and wherein the stopper engages the through-hole to stop the movement of the first gear after the first gear has made one rotation,
    wherein the floss cartridge is attachable and detachable to and from the cartridge housing portion, wherein an unexposed part of the floss stored in the floss cartridge is fed by the first gear in the floss cartridge, and wherein the exposed floss is wound by the second gear.

2. A toothbrush having a dental floss comprising:
    a main body having a cartridge housing portion formed at a first end and a brush portion formed at a second end, wherein the first end is located on an opposite side of the second end of the main body; and
    a floss cartridge, which includes a bridge for cleaning an area between teeth, having a first gear, a second gear and the floss, wherein a part of the floss is exposed, wherein a portion of the first gear is protruded from the floss cartridge, wherein the floss cartridge is attachable and detachable to and from the cartridge housing portion, wherein an unexposed part of the floss is fed by the first gear in the floss cartridge, and wherein the exposed floss is wound by the second gear; and
    an attachable and detachable cover portion for covering the floss cartridge.

3. A toothbrush as claimed in claim 2, wherein the first gear and the second gear are engaged.

4. A toothbrush as claimed in claim 3, the first gear is circular, and wherein the circumference of the first gear is substantially equal to the length of the bridge.

5. A toothbrush as claimed in claim 4, wherein the first gear including a through-hole has a control device for controlling the movement of the first gear.

6. A toothbrush as claimed in claim 5, wherein the control device includes a stopper, and wherein the stopper engages the through-hole to stop the movement of the first gear after the first gear has made one rotation.

7. A toothbrush comprising:
    a main body having a cartridge housing portion formed at a first end and a brush portion formed at a second end, wherein the first end is located on an opposite side of the second end of the main body;
    a floss cartridge, which includes a bridge for cleaning an area between teeth, having a first gear, a second gear and a floss, wherein a part of the floss is exposed, wherein a portion of the first gear is protruded from the floss cartridge,
    wherein the floss cartridge is attachable and detachable to and from the cartridge housing portion, wherein an unexposed part of the floss is fed by the first gear in the floss cartridge, and wherein the exposed floss is wound by the second gear; and
    a movable slide cover portion for covering either the floss cartridge or the brush portion.

8. A toothbrush as claimed in claim 7, wherein a portion of the first gear f the dclivcr side is protruded from cxp scd t the outside of the floss cartridge.

9. A toothbrush as claimed in claim 8, wherein the first gear and the second gear are engaged.

10. A toothbrush as claimed in claim 9, wherein the first gear is circular, and wherein the circumference of the first gear is substantially equal to the length of the bridge.

11. A toothbrush as claimed in claim 10, wherein the first gear including a through-hole has a control device for controlling the movement of the first gear.

12. A toothbrush as claimed in claim 11, wherein the control device includes a stopper, and wherein the stopper engages the through-hole to stop the movement of the first gear after the first gear has made one rotation.

* * * * *